United States Patent
Clement

(12) 
(10) Patent No.: US 10,239,581 B2
(45) Date of Patent: Mar. 26, 2019

(54) BICYCLE BRAKE AND SHIFT LEVER ASSEMBLY

(71) Applicant: Gevenalle, Inc., Portland, OR (US)

(72) Inventor: Adam John Clement, Portland, OR (US)

(73) Assignee: Gevenalle, Inc, Portland, OR (US)

( * ) Notice: Subject to any disclaimer, the term of this patent is extended or adjusted under 35 U.S.C. 154(b) by 986 days.

(21) Appl. No.: 14/051,422

(22) Filed: Oct. 10, 2013

(65) Prior Publication Data
US 2014/0033850 A1 Feb. 6, 2014

Related U.S. Application Data

(63) Continuation-in-part of application No. 13/481,578, filed on May 25, 2012, now abandoned.

(60) Provisional application No. 61/527,980, filed on Aug. 26, 2011.

(51) Int. Cl.
| | |
|---|---|
| B62K 23/06 | (2006.01) |
| B62M 25/04 | (2006.01) |
| G05G 13/00 | (2006.01) |
| B60T 7/10 | (2006.01) |
| B60T 11/04 | (2006.01) |

(52) U.S. Cl.
CPC ............. *B62M 25/04* (2013.01); *B60T 7/102* (2013.01); *B60T 11/046* (2013.01); *B62K 23/06* (2013.01); *G05G 13/00* (2013.01); *Y10T 74/20043* (2015.01)

(58) Field of Classification Search
CPC .............................. B62K 23/06; B62M 25/04
See application file for complete search history.

(56) References Cited

U.S. PATENT DOCUMENTS

| | | | |
|---|---|---|---|
| 3,172,305 | A | 3/1965 | Schwerdhoefer |
| 3,701,333 | A | 10/1972 | Schwerdhoefer |
| 3,701,546 | A | 10/1972 | Schwerdhoefer et al. |
| 3,808,907 | A | 5/1974 | Yamaguchi |
| 4,100,820 | A * | 7/1978 | Evett .............................. 74/489 |
| 4,343,613 | A | 8/1982 | Leiter et al. |
| 4,378,222 | A | 3/1983 | Bergles |
| 4,602,704 | A | 7/1986 | Modolo |
| 4,651,853 | A | 3/1987 | Bergles |
| 4,721,013 | A | 1/1988 | Steuer et al. |

(Continued)

FOREIGN PATENT DOCUMENTS

| | | |
|---|---|---|
| CN | 101190706 A | 6/2008 |
| CN | 101314381 A | 12/2008 |
| DE | 4138311 A1 | 5/1992 |

OTHER PUBLICATIONS

Mar. 4, 2014, International Preliminary Report on Patentability from The International Bureau of WIPO, in PCT/US2012/051826, which shares the same priority as this U.S. application.

(Continued)

*Primary Examiner* — Vicky A Johnson
(74) *Attorney, Agent, or Firm* — Kolitch Romano LLP

(57) ABSTRACT

A shift and brake lever assembly including a brake lever having a first surface facing a handlebar and a second surface facing away from a handlebar. A shift lever may be mounted to the second surface of the brake lever using mounting components. Complementary apertures of the various mounting components may lie on a common longitudinal axis.

20 Claims, 9 Drawing Sheets

(56) References Cited

U.S. PATENT DOCUMENTS

| | | |
|---|---|---|
| D297,133 S | 8/1988 | Modolo |
| 4,771,649 A | 9/1988 | Modolo |
| 4,829,847 A | 5/1989 | Modolo |
| RE33,058 E | 9/1989 | Steuer et al. |
| 4,900,291 A | 2/1990 | Patterson |
| 4,938,733 A | 7/1990 | Patterson |
| 5,102,372 A | 4/1992 | Patterson et al. |
| 5,104,358 A | 4/1992 | Kobayashi |
| 5,188,200 A | 2/1993 | Modolo |
| 5,197,927 A | 3/1993 | Patterson et al. |
| 5,241,878 A * | 9/1993 | Nagano .................... 74/502.2 |
| 5,438,889 A | 8/1995 | Tagawa |
| 5,493,933 A | 2/1996 | Kelly |
| 5,588,925 A | 12/1996 | Arbeiter et al. |
| 5,609,064 A | 3/1997 | Abe |
| 5,620,383 A | 4/1997 | Patterson et al. |
| 5,666,859 A | 9/1997 | Arbeiter et al. |
| 5,676,020 A | 10/1997 | Jordan et al. |
| 5,678,455 A | 10/1997 | Watarai |
| 5,701,786 A | 12/1997 | Kawakami |
| D392,233 S | 3/1998 | Masui |
| 5,728,018 A | 3/1998 | Terada et al. |
| 5,755,139 A | 3/1998 | Kojima |
| 5,768,945 A | 6/1998 | Ose |
| 5,799,542 A | 9/1998 | Yamane |
| 5,832,782 A | 11/1998 | Kawakami |
| 5,848,555 A | 12/1998 | Watarai |
| 5,850,761 A | 12/1998 | Sugimoto |
| 5,862,709 A | 1/1999 | Kageyama |
| 5,893,573 A | 4/1999 | Arbeiter |
| 5,921,138 A | 7/1999 | Kojima et al. |
| 5,921,140 A | 7/1999 | Lemmens |
| 5,941,125 A | 8/1999 | Watarai et al. |
| 5,988,008 A | 11/1999 | Rau |
| 6,042,133 A | 3/2000 | Leiter et al. |
| 6,095,010 A | 8/2000 | Arbeiter et al. |
| 6,105,448 A | 8/2000 | Borschert et al. |
| 6,145,407 A | 11/2000 | Rottmann |
| 6,216,553 B1 | 4/2001 | Wessel et al. |
| 6,450,060 B1 | 9/2002 | Shahana |
| 6,484,603 B2 | 11/2002 | Wessel et al. |
| 6,595,894 B2 | 7/2003 | Hanatani |
| 6,631,655 B2 | 10/2003 | Blaschke et al. |
| 6,634,971 B2 | 10/2003 | Campagnolo |
| 6,729,203 B2 | 5/2004 | Wesling et al. |
| 6,805,023 B2 | 10/2004 | Greetis |
| 6,877,393 B2 | 4/2005 | Takachi |
| 7,013,751 B2 | 3/2006 | Hilsky et al. |
| 7,048,659 B2 | 5/2006 | Campagnolo |
| 7,100,471 B2 | 9/2006 | Irie et al. |
| 7,104,154 B2 | 9/2006 | Hilsky et al. |
| 7,121,968 B2 | 10/2006 | Campagnolo et al. |
| 7,124,874 B2 | 10/2006 | Wang |
| D531,944 S | 11/2006 | Okada |
| D533,124 S | 12/2006 | Hanamura |
| 7,150,205 B2 | 12/2006 | Takachi |
| 7,207,911 B2 | 4/2007 | Campagnolo et al. |
| 7,219,573 B2 | 5/2007 | Dal Pra' |
| D546,741 S | 7/2007 | Iteya et al. |
| 7,258,637 B2 | 8/2007 | Thomasberg |
| 7,270,623 B2 | 9/2007 | Wang |
| D561,075 S | 2/2008 | Arakawa |
| D561,076 S | 2/2008 | Arakawa |
| D563,295 S | 3/2008 | Mabuchi |
| 7,381,142 B2 | 6/2008 | Campagnolo |
| 7,392,723 B2 | 7/2008 | Tsumiyama |
| 7,503,420 B2 | 3/2009 | Fujii |
| 7,665,382 B2 | 2/2010 | Kawakami |
| 7,665,383 B2 | 2/2010 | Kawakami |
| 7,681,472 B2 | 3/2010 | Weiss |
| 7,757,581 B2 | 7/2010 | Okamoto |
| 7,779,718 B2 | 8/2010 | Jordan et al. |
| 7,878,089 B2 | 2/2011 | McLaughlin et al. |
| 2002/0139218 A1 | 10/2002 | Tsumiyama et al. |
| 2002/0194945 A1 | 12/2002 | Greetis |
| 2003/0094064 A1 | 5/2003 | Dal Pra' |
| 2005/0126331 A1 | 6/2005 | Dal Pra |
| 2006/0207376 A1 | 9/2006 | Shipman et al. |
| 2006/0223668 A1 | 10/2006 | Wang |
| 2007/0012137 A1 | 1/2007 | Dal Pra' |
| 2007/0137390 A1 | 6/2007 | Dal Pra' et al. |
| 2007/0175290 A1 * | 8/2007 | Fujii .................... 74/502.2 |
| 2007/0186715 A1 | 8/2007 | Dal Pra' |
| 2008/0076640 A1 | 3/2008 | Lin |
| 2008/0121066 A1 | 3/2008 | Takebayashi et al. |
| 2008/0196537 A1 | 8/2008 | Dal Pra' |
| 2008/0295635 A1 | 12/2008 | Sato et al. |
| 2009/0038427 A1 | 2/2009 | Watarai |
| 2009/0188340 A1 | 7/2009 | Tetsuka et al. |
| 2011/0185836 A1 | 8/2011 | Kawakami |
| 2013/0047774 A1 * | 2/2013 | Clement .................... 74/502.2 |

OTHER PUBLICATIONS

Nov. 16, 2012, International Search Report of the International Searching Authority from The U.S. Receiving Office, in PCT/US2012/51826, which is the international application to this U.S. application.

Nov. 16, 2012, Written Opinion of the International Searching Authority from The U.S. Receiving Office, in PCT/US2012/51826, which is the international application to this U.S. application.

Jan. 22, 2013, Office action US Patent and Trademark Office, in U.S. Appl. No. 13/481,578, which shares the same priority as this U.S. application.

May 13, 2013, Office action US Patent and Trademark Office, in U.S. Appl. No. 13/481,578, which shares the same priority as this U.S. application.

Dec. 15, 2016, Office action from Taiwan Intellectual Property Office, in Taiwan Application No. 1011298883, which shares the same priority as this U.S. application.

* cited by examiner

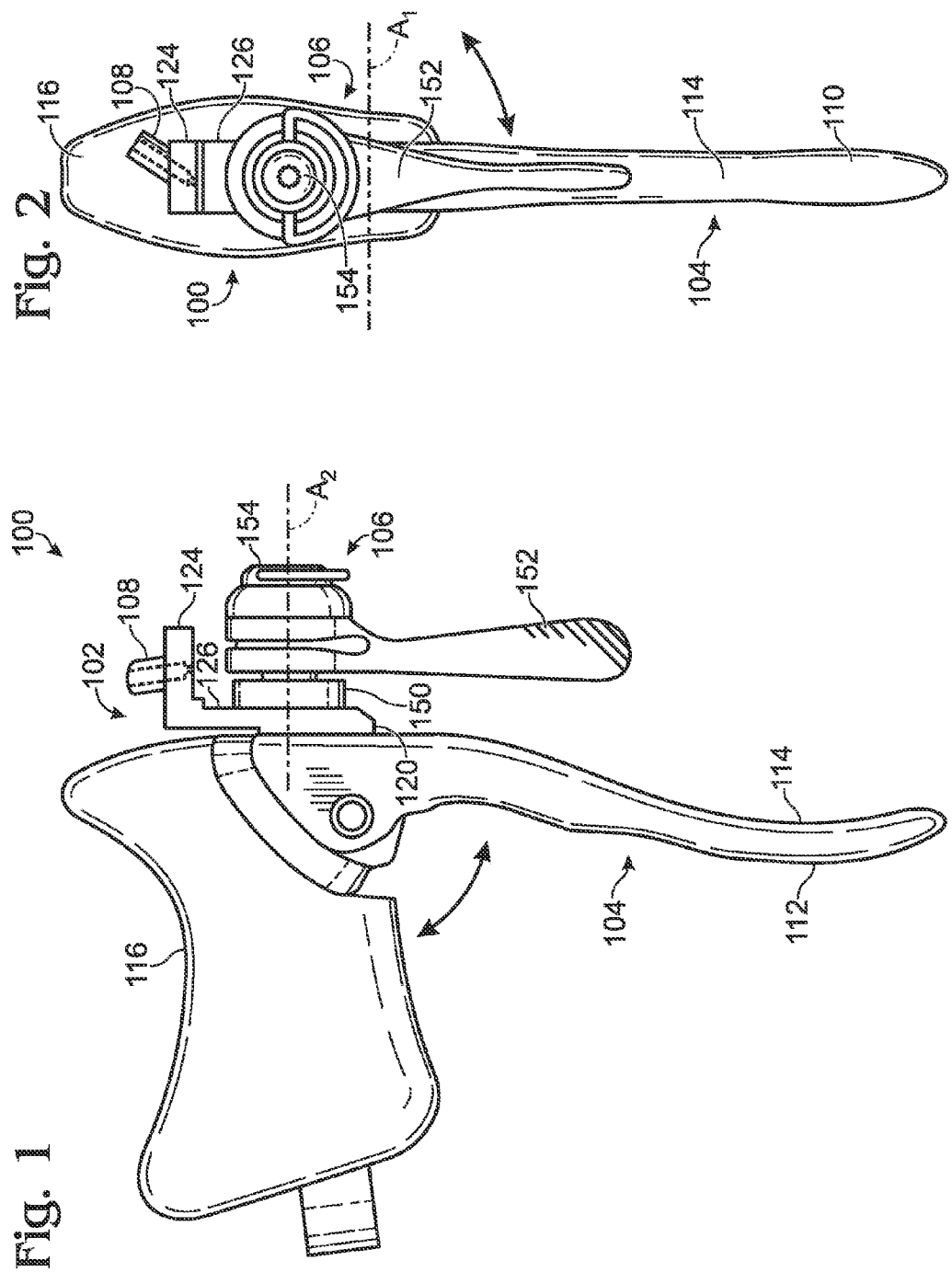

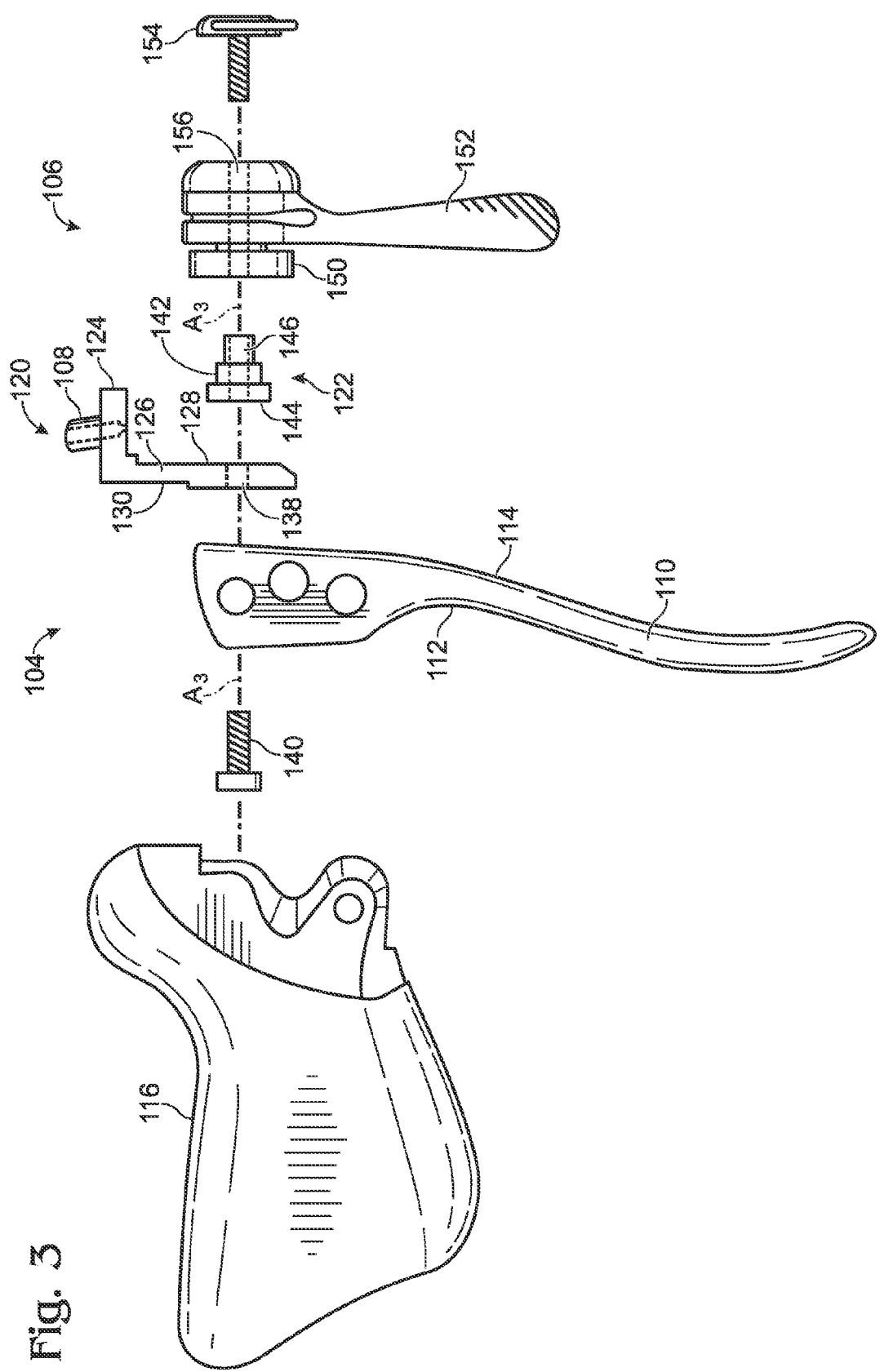

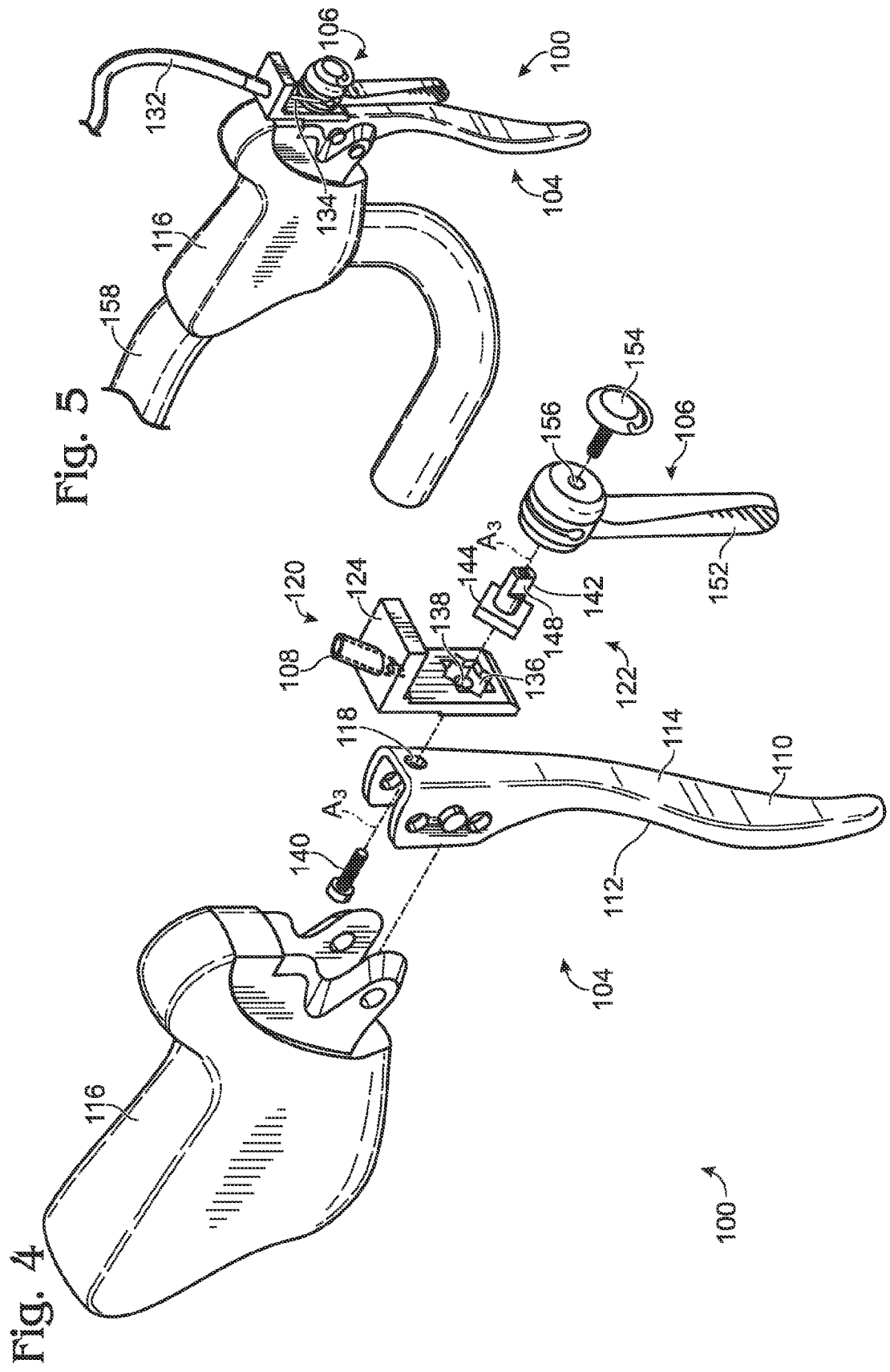

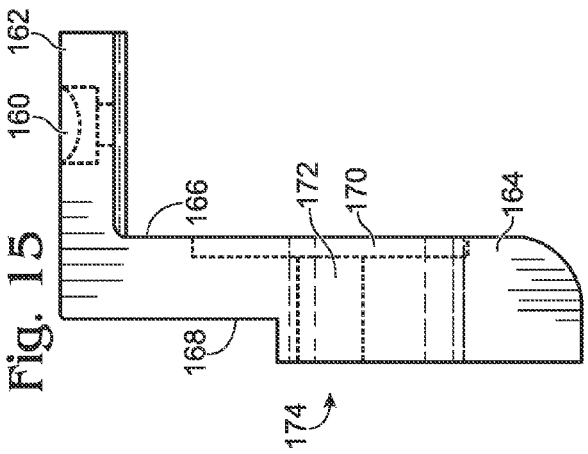
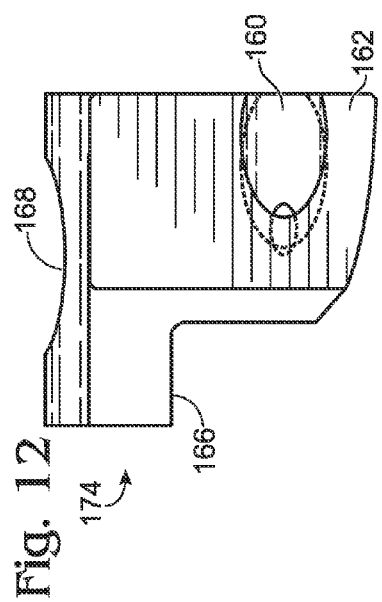
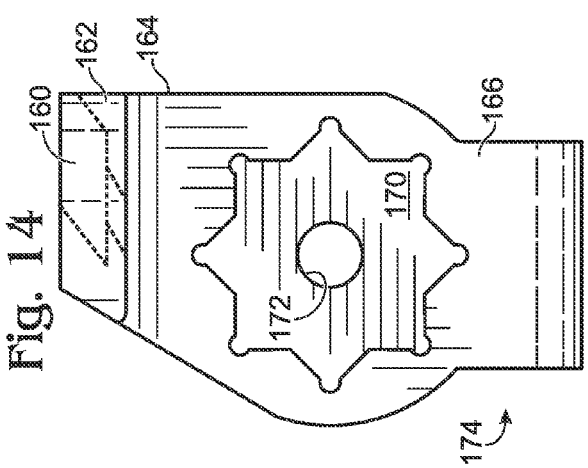
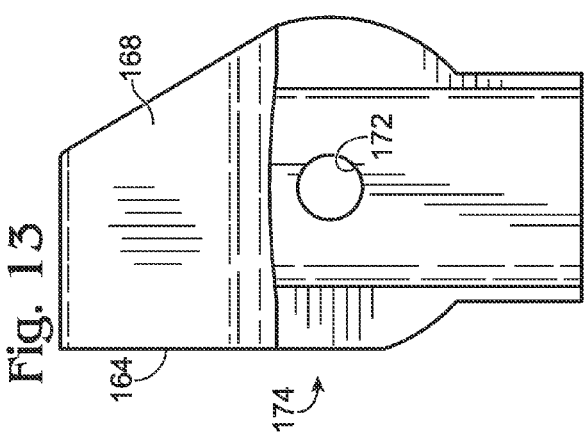

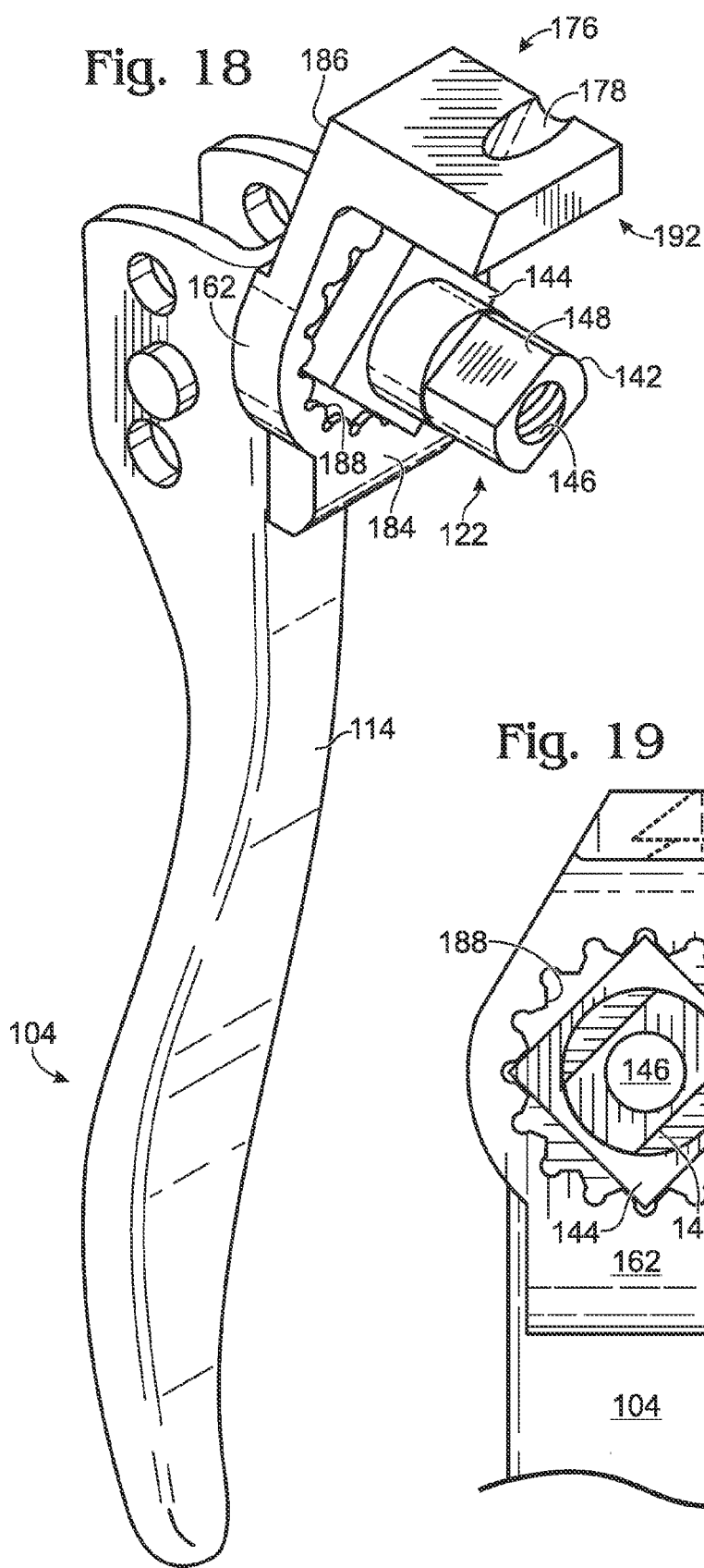

BICYCLE BRAKE AND SHIFT LEVER ASSEMBLY

CROSS-REFERENCE TO RELATED APPLICATIONS

This application is a continuation-in-part of U.S. patent application Ser. No. 13/481,578, filed May 25, 2012, which claims priority to U.S. Provisional Patent Application Ser. No. 61/527,980, filed Aug. 26, 2011, which are hereby incorporated by reference.

INTRODUCTION

Bicycles with multiple gears typically allow a rider to change gears using front and rear derailleurs, which are moved laterally to shift a bicycle chain from one front chainring to another and from one rear cog to another, respectively. Each derailleur is generally moved by applying tension to an associated derailleur cable through some action of the rider, such as movement of a shift lever.

Early bicycle shifting systems, sometimes called "friction systems," used shift levers that relied on precise rider movements of the levers to achieve desired derailleur motions. Later, indexed shift levers were developed, which provide mechanical feedback to the rider and thereby allow a rider to move a shift lever a desired discrete amount, corresponding to a gear change.

Some preexisting bicycle shift levers allow the user to select either a friction mode or an indexed mode, and to switch between modes at will, even while riding the bicycle. For example, U.S. Pat. Nos. 4,744,265 and 4,920,818 assigned to the Shimano Industrial Company of Japan, U.S. Pat. Nos. 4,699,018 and 4,768,395 assigned to Maeda Industries, Ltd. of Japan, and U.S. Pat. No. 4,885,951 assigned to Sachs-Huret S. A. of France, all of which are hereby incorporated by reference into the present disclosure, each describe a mode-switchable shift lever.

Early shift levers were typically spatially separated from the bicycle brake levers, and were configured to be attached either to the down tube of the bicycle ("down tube shifters") or to the ends of the bicycle handlebar ("bar end shifters"). Later, integrated shift levers were developed, which combine a shift lever and a brake lever into a single assembly that could be attached to one location on the bicycle handlebar.

SUMMARY

The present teachings disclose a control device for mounting on a bicycle handlebar. The disclosed control device includes a shift lever and a brake lever configured to be attached to the front surface of the brake lever, i.e. the side of the brake lever farthest from the handlebar. The control device can include a shift lever mount that is integrally formed or otherwise manufactured in conjunction with the brake lever, or the control device can include a bracket or mount that attaches to a preexisting brake lever. Some embodiments of the disclosed control device may use specially made shift levers and/or brake levers, whereas other embodiments may allow the use of preexisting down tube or bar end style shift levers.

BRIEF DESCRIPTION OF THE DRAWINGS

FIG. 1 is a side elevational view of an exemplary right-side control device, according to aspects of the present teachings.

FIG. 2 is a front elevational view of the control device of FIG. 1.

FIG. 3 is an exploded side elevational view of another exemplary control device according to aspects of the present teachings.

FIG. 4 is an exploded isometric view of the control device of FIG. 3.

FIG. 5 is a perspective view showing another exemplary right-side control device mounted to a bicycle handlebar, according to aspects of the present teachings.

FIG. 12 is a top elevational view showing an exemplary mounting bracket that may be used to attach a shift lever to a brake lever, according to aspects of the present teachings.

FIG. 13 is a rear elevational view of the mounting bracket shown in FIG. 12.

FIG. 14 is a front elevational view of the mounting bracket shown in FIG. 12.

FIG. 15 is a side elevational view of the mounting bracket shown in FIG. 12.

FIGS. 18 and 19 are isometric views of yet another exemplary mounting assembly that may be used to attach a shift lever to a brake lever, showing a mounting bracket attached to a brake lever and with a shift lever axle installed in a recess of the mounting bracket, according to aspects of the present teachings.

DESCRIPTION

Figure 6:
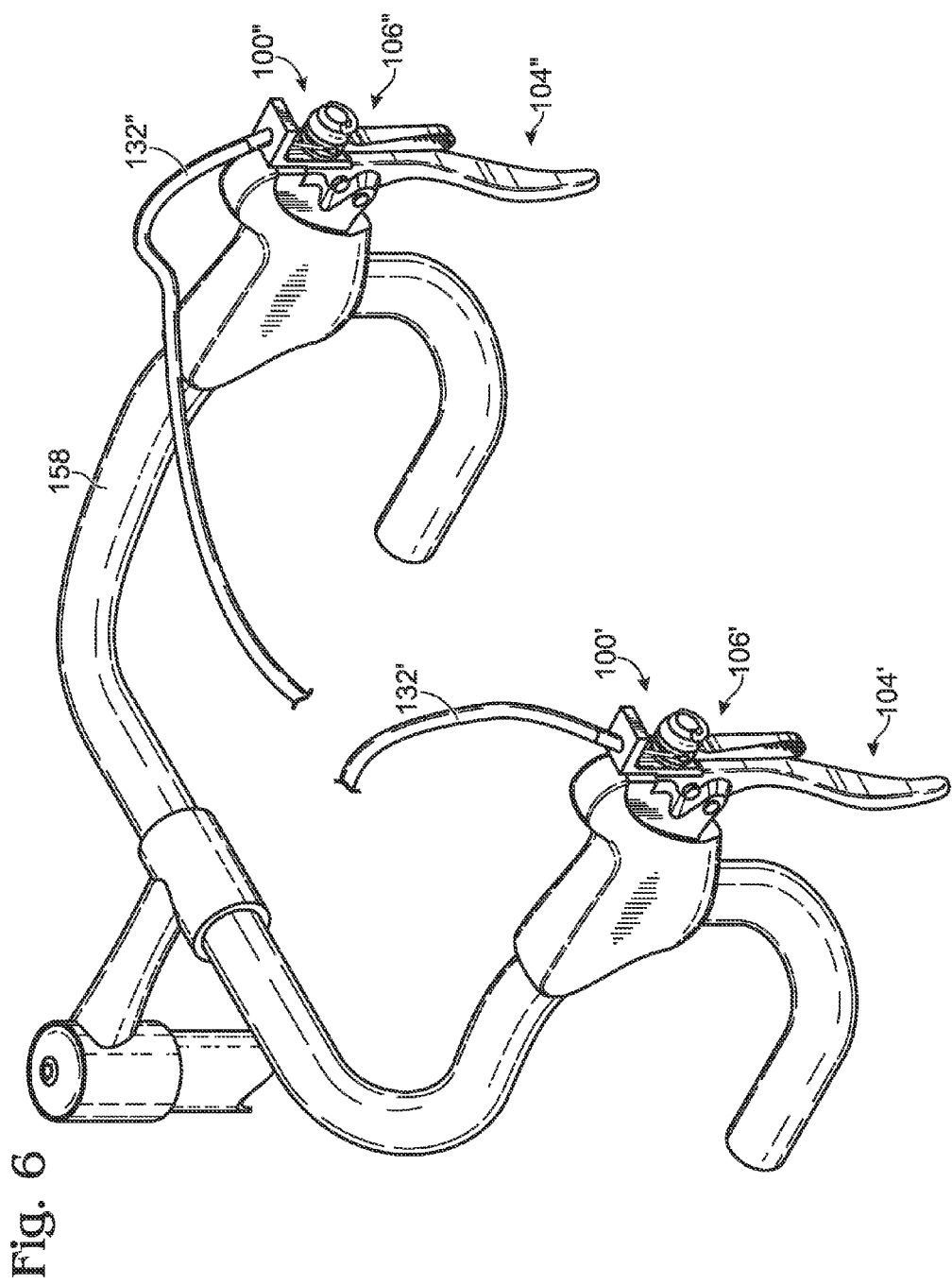
FIG. 6 is a perspective view showing exemplary right-side and left-side control devices mounted to a bicycle handlebar, according to aspects of the present teachings.

In contrast to early non-integrated shift levers, which were often placed along the down tube of a bicycle, many integrated shift levers do not require a rider to remove a hand from the handlebar in order to shift gears. An integrated system of this type is disclosed, for example, in U.S. Pat. No. 5,400,675 assigned to Shimano, Inc., which is hereby incorporated by reference into the present disclosure for all purposes. However, as described below, the Shimano integrated shifting system, which is sold commercially as the Shimano "STI" system, has certain limitations.

For instance, in the Shimano integrated shifting system for bicycles with drop style handlebars, the shift lever is generally disposed between the brake lever and the handlebar, whereas some riders may prefer a shift lever disposed on the opposite side of the brake lever, farther from the handlebar. Furthermore, the Shimano system typically must be purchased as a complete assembly that cannot be dismantled easily, and is therefore relatively expensive both to purchase and to service. For these reasons among others, some riders might find it desirable to use an integrated shifting system that places the shift levers farther from the handlebar than the brake levers, that can be constructed from preexisting, non-integrated components, and that is relatively inexpensive to purchase and to service.

The present teachings disclose a control device, also referred to as a brake and shift lever assembly, for a bicycle handlebar, where the shift lever is configured to be attached to the front surface of the brake lever, i.e. the side of the brake lever farthest from the handlebar. The control device may include a shift lever mount that is integrally formed or otherwise manufactured in conjunction with the brake lever, or the control device can include a bracket or mount that attaches to a preexisting brake lever. Some embodiments of the disclosed control device may use specially made shift levers and/or brake levers, whereas other embodiments may allow the incorporation of stand-alone, preexisting down tube and bar end style shift levers.

In the present disclosure, the term "preexisting brake lever" means a bicycle brake lever manufactured as a stand-alone brake lever, rather than as a component of an integrated braking and shifting control device. Similarly, the term "preexisting shift lever" refers to a bicycle shift lever that was manufactured as a stand-alone down tube or bar end shift lever, rather than as a component of an integrated braking and shifting control device. The terms "stand-alone brake lever," "preexisting stand-alone brake lever," "stand-alone shift lever" and "preexisting stand-alone shift lever" are also used in the present disclosure with the same meanings.

Examples of control devices according to the present teachings are described in more detail below with reference to FIGS. 1-20.

FIG. 1 is a side elevational view and FIG. 2 is a front elevational view depicting a first example of a right-side control device, generally indicated at 100, according to aspects of the present teachings. Control device 100 also may be referred to as shift and brake lever assembly 100. Assembly 100 includes a lever support structure, which has a mounting assembly generally indicated at 102 attached to a rotatable brake lever generally indicated at 104 and a rotatable shift lever generally indicated at 106. Mounting assembly 102 may include one or more specially manufactured components that operatively attach securely to brake lever 104. Mounting assembly 102 also may provide an attachment point for shift lever 106 and/or a cable guide 108 having an aperture adapted to receive and guide a derailleur cable (wire or hydraulic) passing between shift lever 106 and one of the bicycle derailleurs.

In some cases, mounting assembly 102 or an equivalent structure may be formed as a portion of brake lever 104 and/or shift lever 106, rather than as a separate part. In other words, the brake lever and shift lever may be provided with structures that allow them to be joined directly together, rather than joined on opposite sides of a separately formed mounting structure.

Because FIG. 1 shows a right-side assembly, shift lever 106 would normally be associated with the rear derailleur of the bicycle. However, shift lever 106 may be associated with either derailleur. Brake lever 104 may be adapted to be fixed to a bicycle handlebar, and defines a first axis of rotation $A_1$ that can be seen, for example, in FIG. 2. Rotation of brake lever 104 about axis of rotation $A_1$ is configured to move an elongate control portion 110 of the brake lever generally toward and away from the handlebar to which the brake lever is mounted. Typically, the handlebar is mounted to a brake lever hood assembly 116 (e.g., to the left side of brake hood assembly 116 in FIG. 1). The lever support structure may be configured to attach securely to the handlebar. In some embodiments, the lever support structure may include the brake hood assembly. In some embodiments, the brake hood assembly may be described as being included in the handlebar.

Elongate control portion 110 of brake lever 104 may move toward and away from the handlebar within the brake lever plane (e.g., a plane parallel to the view of FIG. 1 and normal to the view of FIG. 2). The brake lever plane may be substantially parallel to a plane defined by a front wheel of the bicycle. Furthermore, brake lever 104 defines a first surface or proximal side 112 configured to face generally toward the handlebar to which the brake lever is mounted, and a second surface or distal side 114 configured to face generally away from the handlebar. Proximal side 112 may be generally closer to the handlebar, and distal side 114 may be generally further from the handlebar. Control devices and assemblies according to the present teachings may be suitable for use on various styles of handlebars, such as drop-style handlebars, so-called "mustache bars," and numerous other handlebar variants.

First axis of rotation $A_1$ may be described as a first pivot disposed at an upper region of the lever support structure. Brake lever 104 may be pivotably connected to the lever support structure through the first pivot axis. Elongate control portion 110 may define an inner brake lever surface (e.g., first surface 112) configured to face generally toward the handlebar and an outer brake surface (e.g., second surface 114) configured to face generally away from the handlebar.

Rotatable shift lever 106 may be adapted to be fixed to or operatively connected to brake lever 104, either directly or through an interposed mounting structure such as mounting structure 102, and the shift lever is disposed on distal side 114 of elongate control portion 110 of the brake lever. Shift lever 106 defines a second axis of rotation $A_2$ that can be seen, for example, in FIG. 1. Shift lever axis $A_2$ may be substantially perpendicular to brake lever axis of rotation $A_1$ when the shift lever is attached to second surface 114 of the brake lever. Alternatively, axis $A_2$ may be oriented non-perpendicularly to axis $A_1$, such as at an angle of 70 degrees to 110 degrees.

When control device 100 is fully installed on a bicycle, movement of the control portion of the brake lever generally toward and away from the handlebar is configured to apply an adjustable amount of tension to a brake cable, and rotation of the shift lever about the second axis of rotation is configured to apply an adjustable amount of tension to a shift cable. Because they are fixed together in the example of FIGS. 1-2, in this case operation of brake lever 104 also causes shift lever 106 as a whole to move through axis of rotation $A_1$ along with the brake lever. However, this movement alone does not affect tension on an associated shift cable.

Second axis of rotation $A_2$ may be described as a second pivot axis disposed at the upper region of the lever support structure in proximity to the first pivot axis. Shift lever 106 may be pivotably connected to the lever support structure through the second pivot axis.

Shift lever 106 may be fixed to brake lever 104 on distal side 114 of brake lever 104 relative to a frame of the bicycle. Typically, the frame of the bicycle is connected to brake lever hood assembly 116 (e.g., generally to the left of brake lever hood assembly 116 in FIG. 1) via the handlebar. For example, the frame of the bicycle associated with control device 100 is generally disposed to the left of the view of FIG. 1, and as such distal side 114 is generally further from the frame than proximal side 112.

Shift lever 106 may be configured to be disposed substantially within the brake lever plane, as shown in FIG. 2, when in a neutral position corresponding to a particular gear of the bicycle. Shift lever 106 may be configured to be rotated out of the brake lever plane (e.g., counter-clockwise and/or clockwise in FIG. 2) and held out of the brake lever plane by friction when in operating positions other than the neutral position (e.g., see FIGS. 7-11). The operating positions may correspond respectively to other particular gears of the bicycle.

FIG. 2 shows the aperture of cable guide 108 extending along a line. The line is angled in an orientation generally tangential to a circular head portion of shift lever 106 and axis of rotation $A_2$. As shown, the line forms an acute angle with a brake lever plane (see below for further description of the brake lever plane).

FIGS. 3 and 4 depict exploded views of illustrative control device 100, showing in more detail how the various components of the control device fit together. As depicted in FIGS. 3 and 4, brake lever 104 may be pivotably mounted to brake lever hood assembly 116, which is typically securely attached to the handlebar. An aperture 118 passes through brake lever 104 near an upper end of the lever.

Mounting assembly 102 includes a mounting bracket, generally indicated at 120, and a shift lever boss or axle, generally indicated at 122, which together are configured to provide a suitable mounting surface and attachment point for mounting shift lever 106 to brake lever 104. Mounting assembly 102 may be disposed between brake lever 104 and shift lever 106. Mounting bracket 120 includes a top flange 124 adapted to accommodate cable guide 108, and a body 126 extending generally perpendicular to top flange 124 and having a front surface 128 and a rear surface 130. Cable guide 108 includes a cylindrical extension protruding from a top surface of top flange 124. Cable guide 108 extends partially through a thickness of top flange 124, with a smaller hole or aperture passing completely through the flange, the smaller hole sized to stop a standard derailleur cable housing 132 while allowing a cable 134 to pass through unimpeded. In other examples, cable guide 108 may not include a cylindrical extension, but rather may simply include a hole or aperture bored into top flange 124 at a suitable angle and sized to receive a standard derailleur cable housing.

Referring back to FIG. 1, flange 124 extends above and over an upper surface of shift lever 106, namely, over base 150 of shift lever 106. In FIG. 1, flange 124 is cantilevered over shift lever 106. Flange 124 may be described as being cantilevered over shift lever 106 even though the cable housing may press against or be configured to pull upward on flange 124. Flange 124 may be described as being cantilevered over shift lever 106 even though an additional support structure may connect flange 124 to body 126 (e.g., a support structure connecting a lower portion of body 126 to a portion of flange 124 disposed opposite brake lever 104 relative to cable guide 108). Flange 124 extending over the upper surface of shift lever 106 and/or flange 124 being cantilevered over shift lever 106 may allow for a convenient passage of the derailleur cable between shift lever 106 and the derailleur, for shift lever 106 to swing to operating positions both to the left and the right of the brake lever plane in FIG. 2, and for rotation of shift lever 106 about axis $A_2$ to exert a sufficient force (e.g., torque, push, and/or pull) on the derailleur cable.

As depicted in FIG. 3, body 126 of mounting bracket 120 may be substantially planar and/or may have a stepped shape. In other examples, rear surface 130 of body 126 may include a concave portion to conform to or facilitate mating with a corresponding convex portion of second surface 114 of brake lever 104. Front surface 128 of body 126 may also be substantially planar. In some examples, front surface 128 may include a shaped recess 136 (see FIG. 4), which may include a discrete depression or recessed area of body 126. The interior surface of recess 136 may form a plane at a substantially continuous depth below the face of front surface 128. Recess 136 may be an indented, molded, or milled portion of front surface 128, and may be any suitable shape and depth configured to interface in a mating or interlocking manner with a surface of shift lever axle 122. For example, shaped recess 136 may include a recess having a rectilinear, star, or polygonal perimeter, and may allow selectable interlocking with shift lever axle 122 in a number of possible orientations. In some examples, shaped recess 136 may include a raised perimeter rising above the face of front surface 128.

Body 126 of mounting bracket 120 also includes an aperture 138 passing through body 126. Aperture 138 may be located at or near the center of shaped recess 136, when a shaped recess is provided. Mounting hardware such as a fastener 140 may pass through aperture 118 and aperture 138 before fastening to shift lever axle 122. In this sense, apertures 118 and 138 may be considered complementary apertures. In some embodiments, a second aperture (not shown) spaced from aperture 138 may be included in body 126 to allow attachment to a second corresponding aperture or protrusion on brake lever 104. Use of such a second aperture may facilitate stabilization of mounting bracket 120 relative to brake lever 104.

In some embodiments, mounting bracket 120 may include a plurality of discrete components rather than being formed as a single piece as depicted in FIGS. 3 and 4. For example, body 126 may be formed separately from top flange portion 124. In other embodiments, top flange 124 and/or cable guide 108 may not be present at all. In still other cases, mounting bracket 120 or an equivalent structure may be formed as part of a brake lever or a shift lever, so that no separate mounting bracket is required.

A shift lever axle according to the present teachings may be any suitable structure configured to provide a fastening point for fastener 140 as well as a mounting axle for shift lever 106. For example, shift lever axle 122 includes an axle portion 142 protruding from a base portion 144, with a central bore 146 running through both the axle and the base. Axle portion 142 is a generally cylindrical protrusion having a proximal end attached to or continuous with base portion 144. Axle portion 142 has flat sides 148 formed in a region proximate a distal end of the axle. In some other examples, two opposing flat sides may extend for the entire length of axle portion 142. Flat sides 148 may facilitate mounting of a shift lever, because some shift levers are keyed to such an axle shape in order to allow selectable alignment and positioning of lever action.

Central bore 146 in shift lever axle 122 includes an axial hole passing completely through a long axis of the shift lever axle. In some other examples, central bore 146 may be divided into two discrete central bore portions lying on a common axis. Central bore 146 may be threaded to facilitate engagement with one or more threaded fasteners. For example, fastener 140 may attach to one end of shift lever axle 122 by way of threaded engagement with central bore 146.

Base portion 144 of shift lever axle 122 takes the form of a substantially planar plate or rectilinear nut, and may be sized and shaped to interlock with recess 136. More specifically, base portion 144 has a square shape, sized to fit into star-shaped recess 136 in any one of several discrete positions. This arrangement locks shift lever axle 122 into a fixed position when fastener 140 is engaged, and facilitates selecting a desired orientation of flat sides 138 of axle portion 142.

As indicated in FIG. 3, for example, shift lever 106 includes a lever boss cover or base 150, a handle or elongate control portion 152 extending from the base, and a fastener 154. Elongate control portion 152 includes a distal tip or end portion that is distal the axis of rotation of shift lever 106, base 150, and fastener 154. Elongate control portion 152 may define an inner shift lever surface facing generally toward the handlebar and brake lever 104, and an outer shift lever surface facing generally away from the handlebar and the brake lever. FIG. 3 shows the inner shift lever surface to be generally in a left side region of elongate control portion 152, and the outer shift lever surface to be generally in a right side region of elongate control portion 152. Similar to FIG. 1, the handlebar may be connected to a left side portion of brake lever hood assembly 116 in FIG. 3.

In the depicted embodiment, shift lever 106 is a preexisting down tube style shift lever. In other embodiments, the shift lever may be a preexisting bar end style shift lever, or a proprietary shift lever that is constructed specifically according to the present teachings, to integrate with the other portions of control device 100. In addition, the shift lever may be an indexed lever configured to rotate by discrete, predetermined amounts to apply discrete changes in tension to an associated shift cable, or the shift lever may be a non-indexed or friction-style lever.

In some embodiments, shift lever 106 may be selected from a group consisting of preexisting stand-alone down tube style shift levers and preexisting stand-alone bar end style shift levers. Furthermore, in some cases the shift lever may be adjustable during operation from an indexed state configured to rotate by discrete, predetermined amounts to a non-indexed state configured to rotate by continuous amounts selected by a user. For example, shift lever 106 may be purely a friction-style lever, examples of which include the preexisting Shimano 6100, 6200, 6300, 7200, and 7300 shifter series, all of which are stand-alone shift levers configured to rotate by continuous amounts and to be held in rotational position by friction at any desired rotational position.

Alternatively, shift lever 106 may provide selective operation in either friction mode or index mode, examples of which include the preexisting Shimano 7400, 7700, 7800 and 7900 series shifters, all which are stand-alone down tube style shift levers, and the Shimano BS77, BS78 and BS79 series shifters, all which are stand-alone bar end style shift levers. When operated in index mode, these levers provide the user with tactile feedback at discrete rotational positions corresponding to a gear change. Like purely friction style levers, these levers are configured to be held in rotational position by friction at any desired rotational position corresponding to a particular gear of the bicycle.

As still another alternative, shift lever 106 may be a lever that, when operated in index mode, returns to a center or neutral position after each shifting operation. For example, the SRAM R2C Aero Shifters automatically return to center after each shift. Similarly, the Campagnolo Bar End Controls return to a selectable initial position after every shift.

All of the above examples of preexisting stand-alone shifters that may be suitable for use in conjunction with the present teachings, including (1) pure friction mode shifters, (2) friction/index mode-switchable shifters, and (3) pure index mode shifters, regardless of whether the shifter is configured to maintain its position or return to an initial position after a shifting operation, share a common distinction over shifters used in prior art integrated shifting and braking assemblies. Namely, in prior art systems such as the Shimano STI system and the SRAM Doubletap system, the shift lever can only be rotated in one direction, whereas in systems according to the present teachings, the shift lever can be rotated in either direction to achieve a corresponding gear shift toward a larger gear or a smaller gear.

More specifically, in the Shimano STI system, rotation of the shift lever in the only permissible direction, which is the inward direction toward the bicycle frame, results in a shift to a smaller cassette cog or "harder" gear, whereas the brake lever must be rotated around the shift lever axis to achieve a shift to a larger cog or "easier" gear. In the SRAM Doubletap system, an inward rotation of the shift lever through a relatively small arc length results in a shift to a smaller cassette cog, and a rotation of the shift lever in the same direction through a relatively large arc length results in a shift to a larger cassette cog. Neither the Shimano STI shift levers nor the SRAM Doubletap levers can be rotated outwardly, away from the bicycle frame.

In contrast, all shift levers contemplated by the current teachings are rotatable about the shift lever axis both inwardly and outwardly relative to the bicycle frame (clockwise and counterclockwise in the view of FIG. 2), with rotation in one direction resulting in a shift to a smaller or "harder" gear, and rotation in the other direction resulting in a shift to a larger or "easier" gear. This provides a significant distinction and simplification over prior art integrated shifter/brake lever assemblies, because it avoids the need for two separate mechanisms to shift in opposite directions.

In embodiments using shift levers that do not return to a neutral position, but rather are held in place by friction after each shift, the simplification described above is only possible by moving the shift lever to the opposite (distal) side of the brake lever relative to the handlebar, because a shift lever disposed on the proximal side of the brake lever would generally interfere with the rider's hand if it were maintained at a position significantly out of alignment with the brake lever. In other words, only the present teachings provide the flexibility of incorporating or accepting a wide variety of possible friction, indexing, and mode-switchable shift levers, which may or may not return to center after a shifting operation.

The examples listed above are not intended to be limiting. Many other friction, indexing, and friction/index mode-switchable stand-alone shift levers have been developed over the past several decades, and one of the advantages of control devices according to the present teachings is that may be used either in conjunction with proprietary shift levers, or in conjunction with a large number of preexisting brake and shift levers. In this context, a "preexisting brake lever" means a brake lever manufactured as a stand-alone lever rather than as part of an integrated braking and shifting assembly, and similarly, a "preexisting shift lever" means a shift lever manufactured as a stand-alone down tube or bar end shift lever. Preexisting brake levers and preexisting shift levers suitable for use in conjunction with the present teachings may be readily available at low prices, due to their relative simplicity and to the evolution of bicycle shifting technology toward fully integrated shifting and braking systems, which has reduced the size of the market for stand-alone brake and shift levers.

In contrast with the present teachings, fully integrated systems are generally sold as complete units, and do not allow for the possibility of incorporating preexisting stand-alone brake levers or preexisting stand-alone shift levers into a combined braking and shifting control device. Examples include the STI line of integrated levers manufactured and sold by Shimano, the Ergopower line of integrated levers manufactured and sold by Campagnolo S.r.l. of Vicenza, Italy, and the Doubletap line of integrated levers manufactured and sold by SRAM LLC of Chicago, Ill.

Fully integrated systems such as those listed above and manufactured by Shimano, Campagnolo and SRAM, which are found on a high percentage of fully assembled new bicycles, either include brake levers and shift levers that are not serviceable or replaceable without replacing the entire integrated assembly, or brake levers and shift levers that may only be replaced with a proprietary lever from the same manufacturer. None of the fully integrated systems contemplate or allow for the use of a preexisting stand-alone brake lever or a preexisting stand-alone shift lever, resulting in relatively higher prices and fewer servicing possibilities compared to systems contemplated by the present teachings.

On the other hand, the present teachings contemplate an integrated shifting and braking control device that can include proprietary brake and/or shift levers, or that can adapt virtually any preexisting brake lever, preexisting down tube shift lever or preexisting bar end shift lever into a combined shifting and braking system.

More specifically, any preexisting brake lever defining a rotational axis, having an elongate control portion extending from the axis and an aperture configured to receive a fastening member, and which is generally configured to be connected to a bicycle brake cable, is suitable for use in conjunction with the present teachings. Similarly, any preexisting shift lever defining a rotational axis, having an elongate control portion extending from the axis and an aperture configured to receive a fastening member, and which is generally configured to be connected to a bicycle derailleur cable, is suitable for use in conjunction with the present teachings, whether or not the shift lever is switchable between index and friction modes of operation.

For example, brake lever 104 depicted in FIGS. 1-5 defines rotational axis $A_1$, includes an elongate control portion 110 extending away from axis $A_1$ and an aperture 118 configured to receive a fastener such as fastener 140 and/or fastener 154 (see FIG. 4), and is generally configured to engage a brake cable with an internal cable stop (not shown), in a manner that is well known in the bicycle industry. Any brake lever sharing these general features may be used in conjunction with the present teachings.

Similarly, shift lever 106 depicted in FIGS. 1-5 defines rotational axis $A_2$, includes an elongate control portion 152 extending away from axis $A_2$ and an aperture 156 configured to receive a fastener such as fastener 140 and/or fastener 154 (see FIG. 3), and is configured to engage a derailleur cable 134 with an internal cable stop (see FIG. 5). Any shift lever sharing these general features may be used in conjunction with the present teachings.

In some cases, a mounting bracket, such as mounting bracket 120 depicted in FIGS. 1-5, may be provided and specially shaped or otherwise configured to interface on each side with particular types of preexisting brake levers and preexisting shift levers having certain geometries. This facilitates using particular preexisting stand-alone brake levers and/or preexisting stand-alone shift levers to construct an integrated braking and shifting assembly according to the present teachings. Various mounting bracket geometries may be used to interface with different types of preexisting levers.

When systems according to the present teachings include a shift lever which is switchable between index and friction modes, such as lever 106, the lever may have a shifting mechanism of the well known type generally described, for example, in U.S. Pat. Nos. 4,744,265 and 4,920,818 to Nagano, and/or U.S. Pat. Nos. 4,699,018 and 4,768,395 to Tagawa, all of which have been incorporated by reference into the present disclosure. The prior art patents all disclose shifters that have both a friction mode and an indexed mode, and where the two modes can be switched to each other using a mode selector mechanism. For example, the mode selector mechanism may be controlled by a "D-ring" handle disposed at an outer position of the shifter and along its rotational axis, as is well known in the art.

More specifically, as described in both the Nagano and Tagawa patents listed above, rotation of the D-ring causes an inner engagement member of the shifter to move both tangentially and radially with respect to the shifter axis of rotation, from one operative position to another. At one operative position, the engagement member engages a plurality of discrete engagement portions of the shifter mechanism disposed at that radius, and thus the shifter will be in index mode. At the other operative position, the engagement member does not coincide with the discrete engagement portions, but rather engages the shifter with a substantially constant frictional force, corresponding to the friction mode of the shifter. Shift lever 106 is depicted in FIGS. 1-11 with a D-ring that may be used for the purpose of switching between index and friction shifting modes; see also D-ring 518 depicted in FIG. 20. This D-ring may not be present if a friction-only shift lever is used.

Shift lever 106 also includes an aperture 156, sized to allow fastener 154 to pass through and secure shift lever 106 to mounting assembly 102. For example, fastener 154 may be a threaded member and may secure shift lever 106 to the mounting assembly by engaging with a threaded central bore 146 of shift lever axle 122. In some embodiments, fastener 154 may be sized such that it may pass completely through shift lever axle 122 as well as complementary apertures 156, 138, and 118, engaging with additional mounting hardware adjacent first surface 112 of brake lever 104. For example, a threaded nut (not shown) may engage with a single fastener 154 to secure shift lever 106, mounting assembly 102, and brake lever 104.

From the previous discussion, it should be understood that aperture 118, aperture 138, central bore 146, and aperture 156 may all lie on a common longitudinal axis $A_3$, as depicted in FIGS. 3 and 4. This arrangement facilitates mounting and securing of the various components, and reduces the number of components required. For example, it allows a single component (the shift lever axle) to secure both the mounting bracket and the shift lever.

FIG. 5 is a perspective view showing illustrative shift and brake lever assembly 100 mounted to a bicycle handlebar 158. As depicted in FIG. 5, cable housing 132 may be held in a suitable position by cable guide 108. Derailleur cable 134 is shown passing through top flange 124 to engage with shift lever 106.

FIG. 6 is a perspective view of two assemblies, each of which is substantially similar to assembly 100 of FIGS. 1-5, mounted to a bicycle handlebar 158. A right side assembly 100' may be in operational control of a rear derailleur, while a left side assembly 100" may be in operational control of a front derailleur. Additional corresponding components of each assembly in FIG. 6 are indicated using similar single-prime (') and double-prime (") reference numerals. In some examples, the left and right side arrangement may be reversed. In other examples, only one assembly 100 may be mounted to a bicycle handlebar. For example, a rider may wish to install only a rear derailleur control assembly 100.

Due to differences in the control needed over the front and rear derailleurs of a bicycle, in some cases the rear derailleur shift lever (i.e., lever 106' in FIG. 6) may be operable in an index mode, whereas the front derailleur shift lever (i.e., lever 106" in FIG. 6) may be operable only in friction mode. In other cases, both shift levers may be operable in index modes, but the index modes may be different. For example, the rear derailleur shift lever may be indexed for 6, 7, 8, 9, or 10 discrete positions, corresponding to the number of rear gear cogs of the bicycle, whereas the front derailleur shift lever may be indexed for 2 or 3 discrete positions, corresponding to the number of front chain rings of the bicycle.

FIGS. 7-11 show the shift lever 106 of illustrative assembly 100 being rotated by hand through a range of operating positions. As depicted in FIGS. 7-11, assembly 100 facilitates such rotation while maintaining an operator's hand atop brake hood assembly 116. This mode of operation and/or shifting position may be desired in several situations. For example, it may be particularly advantageous in cyclocross racing, where a rider's hands are frequently positioned on the brake hoods.

Shift lever 106 may be rotated by hand through the range of operating positions without movement of the brake lever (i.e., without causing the brake lever to move). Shift lever 106 may be configured to be rotated by hand through the range of operating positions within a shift lever plane. The shift lever plane may be substantially perpendicular to the brake lever plane. Shift lever 106 may be held in place by friction at each operating position. Rotation of shift lever 106 through the range of operating positions of the shift lever may be configured to move one of the derailleurs of the bicycle (e.g., toward and/or to one of the discrete positions).

The brake lever plane may be normal to the views of FIGS. 7-11, and extending along the elongate control portion of brake lever 104. The brake lever plane may define and be disposed between first and second regions. For example, the first region may be described as being generally to the left of brake lever 104 in FIGS. 7-11, and the second region may be described as being generally to the right of brake lever 104 in FIGS. 7-11.

Figure 7:
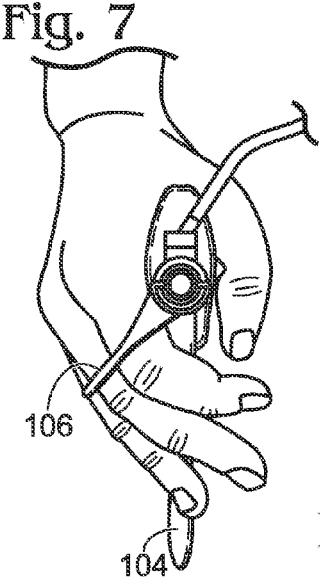
FIGS. 7-11 are front views showing an exemplary right-side control device being moved from one position to another position, according to aspects of the present teachings.

FIG. 7 shows a first operating position of shift lever 106 of the operating positions of shift lever 106 previously described. As shown, the first operating position corresponds to the elongate control portion of shift lever 106 rotated out of the brake lever plane. The elongate control portion of shift lever 106 may be held out of the brake lever plane in the first operating position by friction (e.g., friction provided by the system, not the hand or finger of the operator).

Figure 8:
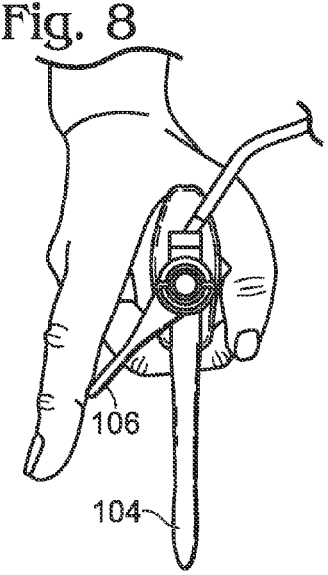

FIG. 8 shows the operator (or rider) pressing on the elongate control portion of shift lever 106 with a finger while maintaining the hand atop the brake lever hood assembly. The operator may move shift lever 106 from the first operating position to the position shown in FIG. 9, which may be a second operating position of shift lever 106.

Figure 9:
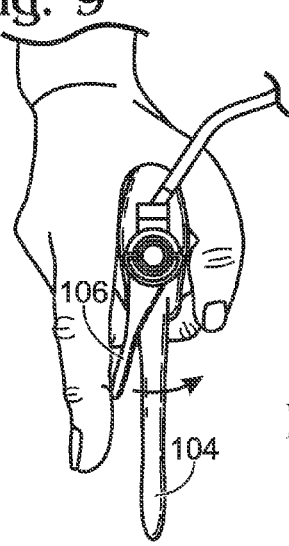
Figure 10:
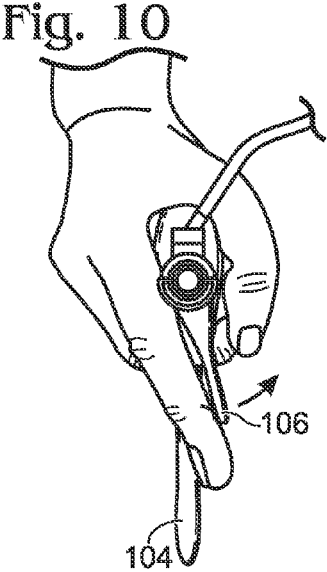
Figure 11:
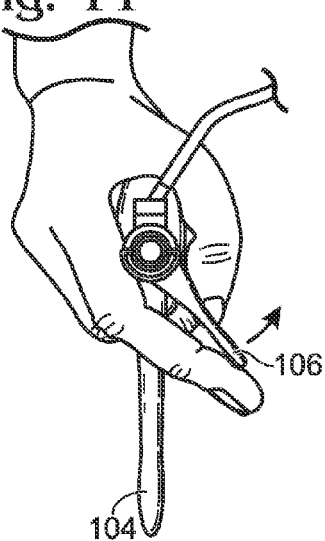

FIGS. 9-11 show the operator moving the elongate control portion of shift lever 106 from the second operating position to a third operating position (shown in FIG. 10), and a fourth operating position (shown in FIG. 11). Shift lever 106 may be held out of the brake lever plane by friction (e.g., friction provided by the system, not the hand or finger of the operator) in each of the second, third, and fourth operating positions.

At least one of the operating positions of shift lever 106 may correspond to the elongate control portion of shift lever 106 rotated into the first region (e.g., the distal tip or end portion of the elongate control portion is disposed in the first and second operating positions shown in FIGS. 7-9) and held in place in the first region by friction, and at least one other of the operating positions may correspond to the elongate control portion of shift lever 106 rotated into the second region (e.g., the distal tip or end portion of the elongate control portion is disposed in the third and fourth operating positions shown in FIGS. 10 and 11) and held in place in the second region by friction. Index mode may correspond to shift lever 106 being configured to be rotated (e.g., about axis of rotation $A_2$—see FIG. 1) by discrete, predetermined amounts to apply discrete changes in tension to an associated shift cable to move a derailleur a discrete, predetermined distance. For example, when in index mode, movement of shift lever 106 from the first operating position (see FIGS. 7 and 8) toward the second operating position (see FIG. 9) may not cause the derailleur to move, but when shift lever 106 is moved to the second operating position, then the derailleur may move from a first location corresponding to the particular gear associated with the first operating position to a second location corresponding to the particular gear associated with the second operating position.

A friction mode may correspond to shift lever 106 being configured to be rotated (e.g., about axis of rotation $A_2$) by continuous amounts selected by the rider to apply continuous changes in tension to the associated shift cable to move the derailleur a continuous distance. For example, when in friction mode, movement of shift lever 106 from the first operating position toward the second operating position results in the derailleur moving from the first location toward the second location.

FIGS. 12-15 depict various magnified views of another illustrative mounting bracket, generally indicated at 174. FIG. 12 is a top view, FIG. 13 is a rear view, FIG. 14 is a front view, and FIG. 15 is a side view. As indicated in FIGS. 12-15, top flange 162 forms a horizontal planar portion of mounting bracket 120 configured to be located above shift lever 106 when installed. Top flange 162 includes cable guide 160, which in this case is configured as a bore hole passing at least partially through the flange. Cable guide 160 is angled to accommodate a derailleur cable that is attached to one side of shift lever 106.

With continuing reference to FIGS. 12-15, a substantially planar body portion 164 meets top flange 162 at an angle in order to position cable guide 160 above shift lever 106 to allow proper routing of cable 134. In the depicted embodiment, body 164 and top flange 162 form a right angle. In other embodiments, body 164 and top flange 162 may form an acute or obtuse angle. As can be seen, for example, in FIG. 14, front surface 166 includes a recessed portion 170 having a shape that facilitates mating or interlocking with base 144 of shift lever axle 122 in one of several possible orientations.

In the embodiment depicted in FIGS. 12-15, recess 170 is formed as an eight-pointed star shape (see FIG. 14) that facilitates orientation of a square base 144 in one of eight possible orientations. Shapes of recess 170 and/or base 144 may be varied to facilitate more or fewer interlocking orientations (see, e.g., FIGS. 18-19). A depth of recess 170 may be less than the thickness of base 144 of shift axle 122. As shown in the embodiment depicted in FIGS. 12-15, an aperture 172 passes completely through bracket 174 at or near the center of recess 170.

Figure 16:
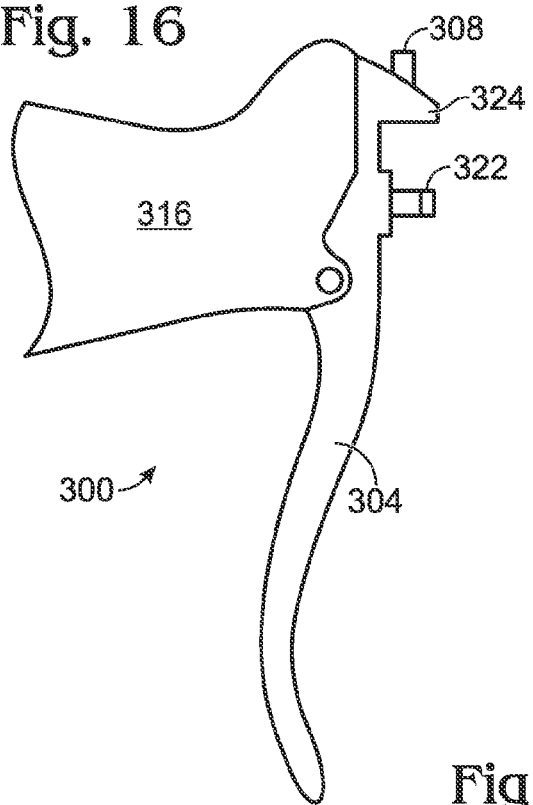
FIG. 16 is a side elevational view of an exemplary alternate brake lever that can be used in conjunction with a shift lever such as the one shown in FIGS. 1-3, according to aspects of the present teachings.

FIG. 16 is a side view of a portion of another exemplary assembly generally indicated at 300. Assembly 300 includes a brake lever 304 configured to include components similar to the components of mounting assembly 102 as an integrated part of the brake lever. For example, brake lever 304 includes a cable guide 308, a top flange 324, and a shift lever axle 322, all integrated into a single unit. Brake lever 304 is mounted on a brake hood assembly 316, and adapted to accept a shift lever such as shift lever 106 without the need for an intermediate mounting assembly.

Figure 17:
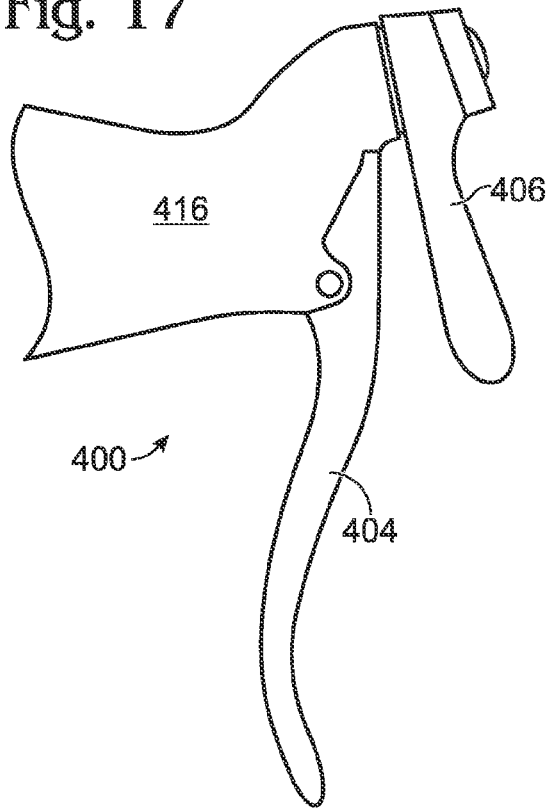
FIG. 17 is a side elevational view of yet another exemplary control device, according to aspects of the present teachings.

FIG. 17 is a side view of yet another exemplary assembly generally indicated at 400. In this example, assembly 400 includes a standard brake lever 404 pivotably mounted to a brake hood assembly 416. Brake hood assembly 416 is adapted to accept shift lever assembly 406 by mounting the shift lever onto an upper portion of the brake hood assembly. This may be done, for example, by including an aperture in the upper portion of the brake hood assembly, to which the shift lever assembly may be mounted using suitable mounting hardware. As in previous embodiments, a shift lever axle such as shift lever axle 122 may be included or integrated into the upper portion of brake hood assembly 416 to facilitate mounting of shift lever assembly 406.

FIG. 18 is an isometric view and FIG. 19 is a front elevational view of yet another mounting assembly, generally indicated at 176, that may be used to attach a shift lever such as lever 106 to a brake lever such as lever 104. FIGS. 18-19 show a mounting bracket 192 attached to a brake lever 104 and a shift lever axle 122 installed in recess 188 of mounting bracket 192. Similar to previous mounting bracket embodiments, bracket 192 includes a cable guide 178 disposed in a top flange 180, a body portion 182 with a front surface 184, a rear surface 186, and an aperture 190. The body is connected to the top flange at a right angle. In this example, recess 188 is configured as a sixteen-pointed star. This configuration allows sixteen possible orientations of the square-based shift lever axle 122 depicted in the drawing.

Figure 20:
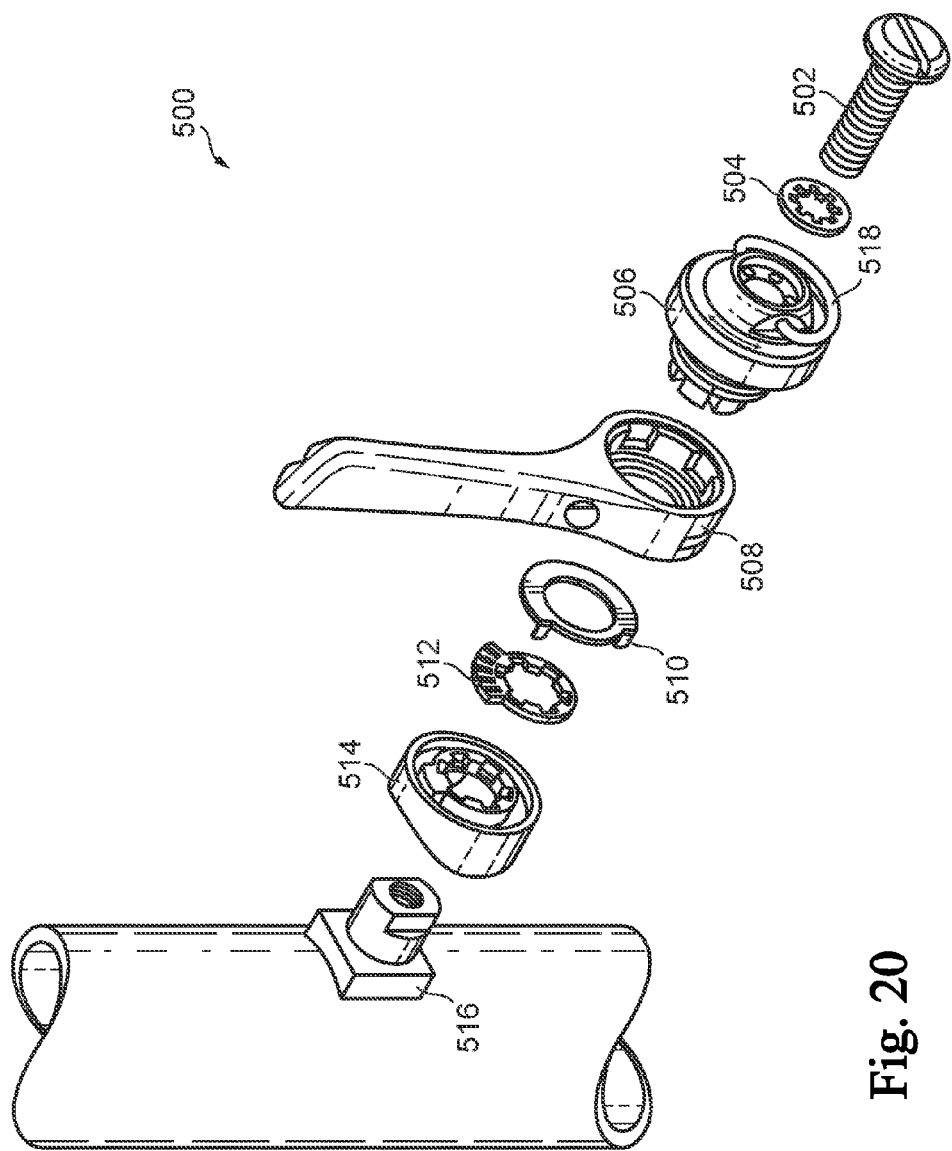
FIG. 20 is a partially exploded view of a stand-alone bicycle shifter suitable for use in conjunction with the present teachings.

FIG. 20 is a partially exploded view depicting additional details of a stand-alone shift lever, generally indicated at 500, which may be suitable for use in conjunction with the present teachings. Shift lever 500 includes a fixing screw 502, a washer 504, an indexing unit 506, an elongate control portion 508, a stopper washer 510, a spacer 512, and a lever boss cover 514. A lever boss 516 may be provided with shift lever 500, or may be pre-installed on a bicycle tube as suggested in FIG. 20. Lever boss cover 514, which also may be referred to as a base portion of shift lever 500, is configured to interface securely with lever boss 516, and to be held in place by fixing screw 502.

When used in conjunction with the present teachings, lever boss cover 514 of shift lever 500 may be configured to interface securely with a boss other than boss 516 that joins the shift lever to a bicycle tube. For example, lever boss cover 514 may be configured to interface with boss 122 depicted in FIG. 3, which is configured to join the shift lever to a mounting bracket such as mounting bracket 120, or directly to a brake lever such as brake lever 104. Regardless of exactly how the shift lever is attached to the bicycle, washer 504 may be provided to help prevent accidental loosening of the fixing screw.

Indexing unit 506 may be of the type described, for example, in any of U.S. Pat. Nos. 4,699,018, 4,768,395, 4,744,265, and/or 4,920,818, all of which have been incorporated by reference, and therefore will not be described in further detail in the present disclosure. Generally speaking, indexing unit 506 is configured to allow shift lever 500 to operate selectively in either index mode or friction mode, by rotating D-ring 518 from one position to another. In some cases, a mode selector mechanism other than a D-ring, such as a rotatable knob or lever, may be provided. Stopper washer 510 and spacer 512 are provided to allow control portion 508 to rotate with respect to boss cover 514.

Shift lever 106 may include an indexing unit, such as indexing unit 506, configured to allow a rider of the bicycle to switch operation of shift lever 106 between index mode and friction mode.

The following paragraphs summarize and further describe advantages and aspects of the present teachings.

The present teachings contemplate a control device for braking and shifting a bicycle having drop-style handlebars, which are typically provided with road bicycles and cyclo-cross bicycles. As in previously known integrated control devices for bicycles with drop handlebars, control devices according to the present teachings include a shift lever and a brake lever that are generally aligned in a plane when the shift lever is in a default or neutral position. This alignment plane is oriented approximately parallel to the plane defined by the front wheel of the bicycle. However, control devices according to the present teachings have several fundamental distinctions and advantages over previously known integrated bicycle control devices for braking and shifting.

First, in previously known integrated braking and shifting control devices for drop handlebars, such as those manufactured and sold by Shimano, Campagnolo and SRAM, the shift lever is generally disposed on a proximal side of the brake lever relative to the bicycle frame. In contrast, in braking and shifting control devices according to the present teachings, the shift lever is generally disposed on a distal side of the brake lever relative to the bicycle frame. As a result, the shift lever may be more conveniently operated by a rider whose hands are positioned on the brake hoods of the bicycle, as is frequently the case, particularly when riding or racing a cyclocross bicycle.

Second, in previously known integrated control devices, the shift lever is configured to return to its neutral position, aligned with the brake lever in the plane defined by the bicycle front wheel, after each shifting operation. In dirty or muddy conditions, this can result in an accumulation of dirt or mud in the small gap between the brake lever and the shift lever, rendering the shift lever inoperable or difficult to operate. On the other hand, in systems according to the present teachings, the shift lever is configured to be retained by friction in a different position corresponding to each gear of the rear cassette of the bicycle. This means that the shift lever will often not be aligned with the brake lever in the plane defined by the bicycle front wheel, but rather will be rotated out of that plane. This decreases the likelihood that dirt or mud can accumulate between the levers.

Third, previously known integrated control devices are generally sold as complete proprietary units, and typically do not provide the user with a convenient way to replace or service individual levers of the integrated device. As a result, purchasing, servicing or replacing a previously known integrated control device is relatively expensive and inconvenient. In contrast, the present teachings contemplate control devices that can incorporate relatively inexpensive, readily available stand-alone brake levers and shift levers of many preexisting types. Accordingly, systems according to the present teachings provide options for convenient servicing and replacement of the components of the system, without necessarily requiring complete replacement of the entire system or the purchase of a proprietary component.

Fourth, because bicycle control systems according to the present teachings can incorporate preexisting, stand-alone levers, shift levers may be used that are switchable by the user between friction and index modes.

Fifth, preexisting (or previously known) integrated control devices (e.g., the Shimano "STI" system, and the integrated system disclosed in U.S. Pat. No. 5,400,675, which has been incorporated by reference into the disclosure) allow for index mode operation, but do not allow for friction mode operation. In rough riding conditions, such as those encountered in cyclo-cross races, a derailleur associated with a shift lever operating in index mode may become misaligned with the particular gears of an associated chain ring (e.g., if the bicycle collides with an object or is substantially shaken). In such a situation, it may be desirable to switch to friction mode, but previously known integrated control devices do not allow for such a switch. In contrast, the present teachings contemplate incorporating an indexing unit into a control device (or integrated control device). Accordingly, systems of the present teachings allow riders to switch to friction mode while maintaining their hands on the hoods of the bicycle, as is frequently the case, particularly when riding in rough or otherwise adverse conditions (e.g., over bumpy or muddy terrain). As a result, riders using systems of the present teachings may switch to friction mode and manually align the derailleur with the particular gears without removing their hands from the handlebars, which may provide for improved cyclo-cross race times.

Embodiments of the present teachings may be described as follows.

A control device for mounting on a bicycle handlebar, the control device may comprise: a rotatable brake lever adapted to be attached to a drop-style handlebar of a bicycle and defining a first axis of rotation, wherein rotation of the brake lever about the first axis of rotation is configured to move an elongate control portion of the brake lever generally toward and away from the handlebar within a brake lever plane substantially parallel to a plane defined by a front wheel of the bicycle; wherein the elongate control portion of the brake lever defines a proximal side generally closer to the handlebar and a distal side generally further from the handlebar; and a rotatable shift lever adapted to be operatively connected to the brake lever and disposed on the distal side of the control portion of the brake lever, the shift lever defining a second axis of rotation substantially perpendicular to the first axis of rotation, and wherein the shift lever may be rotated by hand through a range of operating positions without movement of the brake lever; wherein the shift lever is configured to be disposed substantially within the brake lever plane when in a neutral position corresponding to a particular gear of the bicycle, and to be rotated out of the brake lever plane and held out of the brake lever plane by friction when in operating positions other than the neutral position.

Movement of the control portion of the brake lever generally toward and away from the handlebar within the brake lever plane may be configured to apply an adjustable amount of tension to a brake cable, and the operating positions other than the neutral position may correspond respectively to other particular gears of the bicycle.

The control device may further comprise a mounting assembly may be disposed between the brake lever and the shift lever, the mounting assembly may include a mounting bracket and a shift lever axle.

The shift lever may be selected from a group consisting of preexisting stand-alone down tube style shift levers and preexisting stand-alone bar end style shift levers.

The shift lever may include an indexing unit configured to allow a rider of the bicycle to switch operation of the shift lever between an index mode and a friction mode.

The index mode may correspond to the shift lever being configured to be rotated by discrete, predetermined amounts to apply discrete changes in tension to an associated shift cable to move a derailleur a discrete, predetermined distance. The friction mode may correspond to the shift lever being configured to be rotated by continuous amounts selected by the rider to apply continuous changes in tension to the associated shift cable to move the derailleur a continuous distance.

A control device for mounting on a handlebar of a bicycle, the control device may comprise: a rotatable brake lever adapted to be fixed to the handlebar and defining a first axis of rotation, wherein rotation of the brake lever about the first axis of rotation is configured to move a control portion of the brake lever generally toward and away from the handlebar within a brake lever plane which is substantially parallel to a plane defined by a front wheel of the bicycle; and a rotatable shift lever adapted to be fixed to the brake lever on a distal side of the brake lever relative to a frame of the bicycle and defining a second axis of rotation oriented at an angle between 70 degrees and 110 degrees relative to the first axis of rotation.

The shift lever may include an indexing unit for allowing the shift lever to operate selectively in either an index mode or a friction mode.

In some embodiments, an indexing unit of the shift lever may include means for allowing the shift lever to operate selectively in either index mode or friction mode.

The index mode may correspond to the shift lever being configured to be rotated by discrete, predetermined amounts to apply discrete changes in tension to an associated shift cable to move a derailleur a discrete, predetermined distance. The friction mode may correspond to the shift lever being configured to be rotated by continuous amounts selected by a rider of the bicycle to apply continuous changes in tension to the associated shift cable to move the derailleur a continuous distance.

The shift lever may be rotated by hand about the second axis through a range of operating positions without causing movement of the brake lever, and each of the operating positions may correspond to a particular gear of the bicycle.

At least one of the operating positions of the shift lever may correspond to an elongate control portion of the shift lever being disposed substantially within the brake lever plane, and at least one of the other operating positions of the shift lever may correspond to the elongate control portion of the shift lever rotated substantially out of the brake lever plane and held out of the brake lever plane by friction.

The brake lever plane may define and may be disposed between first and second regions. At least one of the operating positions may correspond to an elongate portion control portion of the shift lever rotated into the first region and held in place in the first region by friction, and at least one other of the operating positions may correspond to the elongate control portion of the shift lever rotated into the second region and held in place in the second region by friction.

The shift lever may be selected from a group consisting of preexisting down tube style shift levers and preexisting bar end style shift levers.

The control device may further comprise a mounting bracket disposed between the brake lever and the shift lever. The mounting bracket may include a cable guide having an aperture adapted to receive and guide a derailleur cable passing between the shift lever and a derailleur of the bicycle. The aperture may extend along a line. The line may form an acute angle with the brake lever plane.

A control device for mounting on a drop-style handlebar of a bicycle, the control device may comprise: a lever support structure configured to attach securely to the handlebar; a first pivot axis disposed at an upper region of the lever support structure; a brake lever pivotably connected to the lever support structure through the first pivot axis, the brake lever including an elongate control portion defining an inner brake lever surface configured to face generally toward the handlebar and an outer brake lever surface configured to face generally away from the handlebar; a second pivot axis disposed at the upper region of the lever support structure in proximity to the first pivot axis; and a shift lever pivotably connected to the lever support structure through the second pivot axis, the shift lever including an elongate control portion defining an inner shift lever surface facing generally toward the handlebar and the brake lever, and an outer shift lever surface facing generally away from the handlebar and the brake lever.

The brake lever may be configured to be rotated by hand through a range of operating positions within a brake lever plane.

The shift lever may be configured to be rotated by hand through a range of operating positions within a shift lever plane substantially perpendicular to the brake lever plane, and to be held in place by friction at each operating position.

The shift lever may be configured to rotate through the range of operating positions within the shift lever plane without movement of the brake lever.

The shift lever may include an indexing unit for allowing the shift lever to operate selectively in either an index mode or a friction mode.

The index mode may correspond to the shift lever being configured to be rotated by discrete, predetermined amounts to apply discrete changes in tension to an associated shift cable to move a derailleur a discrete, predetermined distance.

The friction mode may correspond to the shift lever being configured to be rotated by continuous amounts selected by a rider of the bicycle to apply continuous changes in tension to the associated shift cable to move the derailleur a continuous distance.

The shift lever may be selected from a group consisting of preexisting stand-alone tube style shift levers and preexisting stand-alone bar end style shift levers.

Rotation of the brake lever through the range of operating positions of the brake lever may be configured to apply an adjustable amount of tension to a brake cable. Rotation of the shift lever through the range of operating positions of the shift lever may be configured to move (or shift) a derailleur of the bicycle (e.g., between particular gears of the bicycle).

The control device may further comprise a mounting bracket disposed between the brake lever and the shift lever. The mounting bracket may include a flange cantilevered over the shift lever. The flange may include a cable guide adapted to receive and guide a derailleur cable passing between the shift lever and the derailleur.

The disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A control device for mounting on a bicycle handlebar, the control device comprising:
   a rotatable brake lever adapted to be attached to a drop-style handlebar of a bicycle and defining a first axis of rotation, wherein rotation of the brake lever about the first axis of rotation is configured to move an elongate control portion of the brake lever generally toward and away from the handlebar within a brake lever plane;
   wherein the control portion of the brake lever defines a proximal side generally closer to the handlebar and a distal side generally further from the handlebar; and
   a rotatable shift lever adapted to be operatively connected to the brake lever and disposed on the distal side of the control portion of the brake lever, the shift lever defining a second axis of rotation substantially perpendicular to the first axis of rotation, and wherein the shift lever may be rotated by hand through a plurality of operating positions without movement of the brake lever;
   wherein each operating position of the shift lever corresponds to a gear of the bicycle, and wherein the shift lever is configured to be rotated in a first direction to cause a shift into a smaller gear, and to be rotated in a second direction to cause a shift into a larger gear; and
   wherein the shift lever is configured to be mechanically held in a selected one of the operating positions after being rotated.

2. The control device of claim 1, wherein the shift lever is configured to be disposed substantially within the brake lever plane when in a neutral position corresponding to a particular gear of the bicycle, and to be rotated out of the brake lever plane and held out of the brake lever plane by friction when in a range of operating positions other than the neutral position which correspond respectively to other gears of the bicycle.

3. The control device of claim 1, further comprising a mounting assembly disposed between the brake lever and the shift lever, the mounting assembly including a mounting bracket and a shift lever axle, and configured to be securely attached to both the brake lever and the shift lever.

4. The control device of claim 1, wherein the shift lever is selected from a group consisting of preexisting stand-alone down tube style shift levers and preexisting stand-alone bar end style shift levers.

5. The control device of claim 1, wherein the shift lever includes an indexing unit configured to allow a rider of the bicycle to switch operation of the shift lever between an index mode wherein the shift lever is configured to be rotated by discrete, predetermined amounts to apply discrete changes in tension to an associated shift cable to move a derailleur a discrete, predetermined distance, and a friction mode wherein the shift lever is configured to be rotated by continuous amounts selected by the rider to apply continuous changes in tension to the associated shift cable to move the derailleur a continuous distance.

6. The control device of claim 1, further comprising a mounting bracket disposed between the brake lever and the shift lever, the mounting bracket including a cable guide adapted to receive and guide a derailleur cable passing between the shift lever and a derailleur of the bicycle, wherein the cable guide is configured to guide the derailleur cable such that the derailleur cable passes external to the brake lever.

7. A control device for mounting on a handlebar of a bicycle, the control device comprising:
   a rotatable brake lever adapted to be fixed to the handlebar and defining a first axis of rotation, wherein rotation of the brake lever about the first axis of rotation is configured to move a control portion of the brake lever generally toward and away from the handlebar within a brake lever plane; and
   a rotatable shift lever adapted to be fixed to the brake lever on a distal side of the brake lever relative to a frame of the bicycle and defining a second axis of rotation oriented at an angle between 70 degrees and 110 degrees relative to the first axis of rotation;
   wherein the shift lever is a mode-switchable lever including means for operating selectively in either an index mode or a friction mode.

8. The control device of claim 7, wherein the shift lever is configured to rotate in a first direction to cause a shift to a larger gear and to rotate in a second direction to cause a shift to a smaller gear.

9. The control device of claim 7, wherein the shift lever may be rotated by hand about the second axis through a range of operating positions without causing movement of the brake lever, each of the operating positions corresponding to a particular gear of the bicycle.

10. The control device of claim 9, wherein at least one of the operating positions of the shift lever corresponds to an elongate control portion of the shift lever being disposed substantially within the brake lever plane, and at least one of the other operating positions of the shift lever corresponds to the elongate control portion of the shift lever rotated substantially out of the brake lever plane and held out of the brake lever plane by friction.

11. The control device of claim 9, wherein the brake lever plane defines and is disposed between first and second regions, at least one of the operating positions corresponding to an elongate control portion of the shift lever rotated into the first region and held in place in the first region by friction, at least one other of the operating positions corresponding to the elongate control portion of the shift lever rotated into in the second region and held in place in the second region by friction.

12. The control device of claim 7, wherein the shift lever is selected from a group consisting of preexisting down tube style shift levers and preexisting bar end style shift levers.

13. The control device of claim 7, further comprising a mounting bracket disposed between the brake lever and the shift lever, the mounting bracket including a cable guide having an aperture adapted to receive and guide a derailleur cable passing between the shift lever and a derailleur of the bicycle, wherein the aperture extends along a line, the line forming an acute angle with the brake lever plane.

14. A control device for mounting on a drop-style handlebar of a bicycle, the control device comprising:
   a lever support structure configured to attach securely to the handlebar;
   a first pivot axis disposed at an upper region of the lever support structure;
   a brake lever pivotably connected to the lever support structure through the first pivot axis, the brake lever including an elongate control portion defining an inner brake lever surface configured to face generally toward the handlebar and an outer brake lever surface configured to face generally away from the handlebar;
   a second pivot axis disposed at the upper region of the lever support structure in proximity to the first pivot axis; and
   a shift lever pivotably connected to the lever support structure through the second pivot axis, the shift lever including an elongate control portion defining an inner shift lever surface facing generally toward the handlebar and the brake lever, and an outer shift lever surface facing generally away from the handlebar and the brake lever;
   wherein the brake lever is configured to be rotated by hand through a range of operating positions within a brake lever plane; and
   wherein the shift lever is configured to be rotated by hand through a range of operating positions within a shift lever plane substantially perpendicular to the brake lever plane, and to be held in place by friction at each operating position.

15. The control device of claim 14, wherein the shift lever is configured to rotate through the range of operating positions within the shift lever plane without movement of the brake lever.

16. The control device of claim 14, wherein the shift lever includes an indexing unit for allowing the shift lever to operate selectively in either an index mode or a friction mode.

17. The control device of claim 16, wherein the index mode corresponds to the shift lever being configured to be rotated by discrete, predetermined amounts to apply discrete changes in tension to an associated shift cable to move a derailleur a discrete, predetermined distance, and wherein the friction mode corresponds to the shift lever being configured to be rotated by continuous amounts selected by a rider of the bicycle to apply continuous changes in tension to the associated shift cable to move the derailleur a continuous distance.

18. The control device of claim 14, wherein the shift lever is selected from a group consisting of preexisting stand-alone tube style shift levers and preexisting stand-alone bar end style shift levers.

19. The control device of claim 14, wherein rotation of the brake lever through the range of operating positions of the brake lever is configured to apply an adjustable amount of tension to a brake cable, and wherein rotation of the shift lever through the range of operating positions of the shift lever is configured to move a derailleur of the bicycle.

20. The control device of claim 14, further comprising a mounting bracket disposed between the brake lever and the shift lever, the mounting bracket including a flange cantilevered over the shift lever, the flange including a cable guide adapted to receive and guide a derailleur cable passing between the shift lever and a derailleur.

* * * * *